United States Patent
Rizk et al.

(10) Patent No.: US 9,093,834 B2
(45) Date of Patent: Jul. 28, 2015

(54) LIGHTNING PROTECTION APPARATUS AND METHOD FOR FLOATING ROOF TANK

(76) Inventors: Farouk A. M. Rizk, Saint-Lambert (CA); Amr Rizk, Saint-Lambert (CA)

(*) Notice: Subject to any disclaimer, the term of this patent is extended or adjusted under 35 U.S.C. 154(b) by 203 days.

(21) Appl. No.: 13/885,498

(22) PCT Filed: Nov. 15, 2011

(86) PCT No.: PCT/CA2011/050703
§ 371 (c)(1),
(2), (4) Date: May 15, 2013

(87) PCT Pub. No.: WO2012/065261
PCT Pub. Date: May 24, 2012

(65) Prior Publication Data
US 2013/0229744 A1    Sep. 5, 2013

Related U.S. Application Data

(60) Provisional application No. 61/413,760, filed on Nov. 15, 2010.

(51) Int. Cl.
| | |
|---|---|
| H02H 1/04 | (2006.01) |
| B65D 88/34 | (2006.01) |
| B65D 90/22 | (2006.01) |
| H02G 13/00 | (2006.01) |

(52) U.S. Cl.
CPC ............. H02H 1/04 (2013.01); B65D 88/34 (2013.01); B65D 90/22 (2013.01); H02G 13/00 (2013.01)

(58) Field of Classification Search
CPC ......... H02H 1/04; H02G 13/00; B65D 88/34; B65D 90/22
See application file for complete search history.

(56) References Cited

U.S. PATENT DOCUMENTS

| | | | |
|---|---|---|---|
| 1,674,073 A | 6/1928 | Stough | |
| 1,732,779 A | 10/1929 | Stough | |
| 1,974,315 A | 9/1934 | Schaeffer | |
| 2,936,925 A * | 5/1960 | Moyer et al. | 220/224 |
| 4,605,814 A * | 8/1986 | Gillem | 174/2 |
| 4,613,922 A | 9/1986 | Bachmann | |
| 6,529,103 B1 * | 3/2003 | Brendel et al. | 333/182 |
| 7,124,906 B2 | 10/2006 | Hamer et al. | |

OTHER PUBLICATIONS

American Petrolium Institute's Recommended Practices for Lightning Protection of Aboveground Storage Tanks for Flammable of Combustible Liquids, API 545, First Edition Oct. 2009.

* cited by examiner

*Primary Examiner* — Zeev V Kitov
(74) *Attorney, Agent, or Firm* — Goudreau Gage Dubuc; Gonzalo Lavin (57) ABSTRACT

The present invention relates to protection of floating roof tanks from the effects of lightning. In prior floating roof tanks, even if the floating roof is electrically connected to the tank wall shell at a number of locations by shunts and additionally with by-pass conductors above or below the liquid level, this may not prevent streamer discharges in gaps subject to induced potentials due to the penetrating electromagnetic waves and thus fires remain a real possibility. The present invention solves this problem by providing a lightning protection apparatus including an electrode; and a plurality of conductors, each conductor having a first end electrically bonded to the electrode and a second opposite terminal end electrically bonded to an outer side wall of the floating roof tank. The conductors emanate radially from the electrode and are spaced from each other so as to provide electromagnetic shielding to the floating roof tank from electromagnetic waves caused by a lighting strike.

11 Claims, 8 Drawing Sheets

LIGHTNING PROTECTION APPARATUS AND METHOD FOR FLOATING ROOF TANK

CROSS-REFERENCE TO RELATED APPLICATIONS

This application is a National Entry Application of PCT application no PCT/CA2011/050703 filed on Nov. 15, 2011 and published in English under PCT Article 21(2), which itself claims benefit of U.S. provisional application Ser. No. 61/413,760, filed on Nov. 15, 2010. All documents above are incorporated herein in their entirety by reference.

FIELD OF THE INVENTION

The present invention relates to protection of floating roof tanks from the effects of lightning.

BACKGROUND OF THE INVENTION

U.S. Pat. No. 7,124,906 B2, issued on Oct. 24, 2006, by Hamer et al. discloses the problem of lightning strikes that hit storage vessels containing flammable materials, which can cause devastating incidents. Hamer further discloses that floating roof tanks are widely used to store volatile petroleum-based liquids and limit the quantity of product evaporative emissions that may escape to the environment. Such tanks may be configured either as internal floating-roof tanks or as external floating-roof tanks. An internal floating roof tank differs from an external roof tank in that in the former case, a separate external fixed roof is positioned above of the internal floating roof tank. In each configuration, the floating roof is designed to remain in contact with the product liquid surface and cover almost the entire surface of the product. A small annular area between the outermost rim of the floating roof and the inside surface of the tank shell is covered by a seal attached to the rim of the floating roof. According to Hamer, an effective defense against ignition by a direct stroke is a tight seal. Also, according to Hamer, fires are caused as a result of discharges caused by lightning, where the ignition can be from a direct stroke or from the sudden discharge of an induced (bound) charge on the floating roof, released when the charge on a cloud discharges to ground or to another cloud. Hamer discloses that a solution to the lightning problem is to have the floating roof electrically bonded to shoes of the seal on the circumference of the tank, but Hamer also discloses that the shunts and shoes do not adequately protect the floating roof storage tanks from the effects of a lightning strike. Hamer therefore proposes the use of a submerged bonding strap or shunt to eliminate the "above the seal" bonding strap. Therefore, Hamer clearly demonstrates that the prevailing perception of the lightning problem is limited to currents that come directly from the return stroke of the lightning discharge. This perception is repeated in the American Petroleum Institute's Recommended Practices for Lightning Protection of Aboveground Storage Tanks for Flammable of Combustible Liquids, API 545, First Edition October 2009.

However, when lightning strikes in the vicinity of a tank, whether the lightning current is conducted via a single lightning mast to ground or whether the lightning hits the ground directly, the return stroke current in either case will produce intense electromagnetic fields. These electromagnetic waves propagate radially around the lightning channel. When these waves hit an external floating roof tank, the poor electromagnetic shielding of the structure leads to induced potentials on the tank wall and on the floating roof. Wherever there are discontinuities in current paths, induced potential differences can give rise to streamer discharges or sparking. So even if the floating roof of the tank is electrically connected to the tank wall shell at a number of locations by shunts and additionally with by-pass conductors above or below the liquid level, this may not prevent streamer discharges in gaps subject to induced potentials due to the penetrating electromagnetic waves and thus fires remain a real possibility.

The application of by-pass conductors or other conductor systems that bond the wall of the tank directly to the floating roof may also further exasperate the problem by producing open conducting loops which act as magnetic loop antennas, with regards to the penetrating electromagnetic waves coming from the lightning channel.

The present description refers to a number of documents, the content of which is herein incorporated by reference in their entirety.

SUMMARY OF THE INVENTION

An object of the present invention is to limit the possibility of induced potentials inside an external floating roof tank due to the electromagnetic waves arising from nearby lightning strikes as well as direct strikes to the tank.

More specifically, in accordance with the present invention, there is provided a lightning protection method and apparatus for a floating roof tank having an external floating roof, the lightning protection apparatus comprising: an electrode; and a plurality of conductors, each conductor having a first end electrically bonded to the electrode and a second opposite terminal end electrically bonded to an outer side wall of the floating roof tank; wherein the conductors emanate radially from the electrode and are spaced from each other so as to provide electromagnetic shielding to the floating roof tank from electromagnetic waves caused by a lighting strike, the apparatus being suspended above the external floating roof of the tank and not in contact with the external floating roof.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

In order to address the problem of induced potentials inside an external floating roof tank due to the electromagnetic fields caused by a lightning strike, the inventors have found that, a number of solutions can be arrived at via a number of different methods. One such method of improving the electromagnetic shielding characteristics of the external floating comparatively different electric conductivities and magnetic permeabilities. For example, if the tank wall is made of steel, covering the steel walls with a layer of copper would significantly improve its electromagnetic shielding characteristics. The degree of electromagnetic shielding would be determined by the amount of copper used. For the highest degree of shielding by this method the entire outer wall of the steel oil tank would be covered in copper plates. However, such solution would be quite expensive and would be ineffective against waves coming from above the tank wall. A less effective but also less expensive method is to horizontally wrap the outer tank wall with copper strips. The vertical spacing in between such strips would determine the cost and the level of effectiveness of the shielding.

Another way to improve the electromagnetic shielding characteristics of the external floating roof tank is to provide the tank with some kind of an additional electrically conductive roof that does not interfere with the intended function of the floating roof nor does it compare to the cost of a completely covering the tank as with a fixed roof tank with an internal floating roof.

Figure 1A:
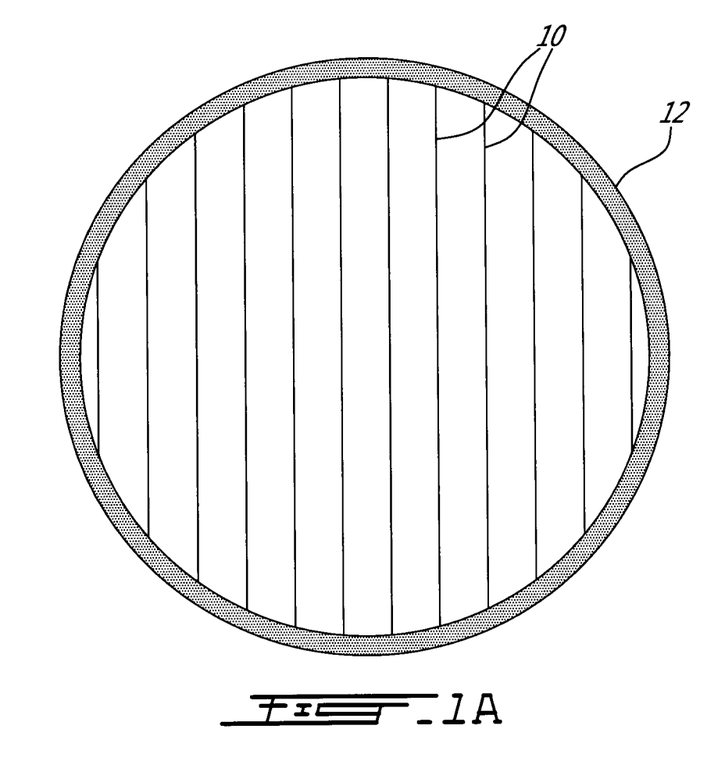
FIG. 1A is a top schematic view of a lightning protection apparatus, wherein a series of parallel conductors are installed on an external floating roof tank, according to a first preferred embodiment of the present invention.
Figure 1B:
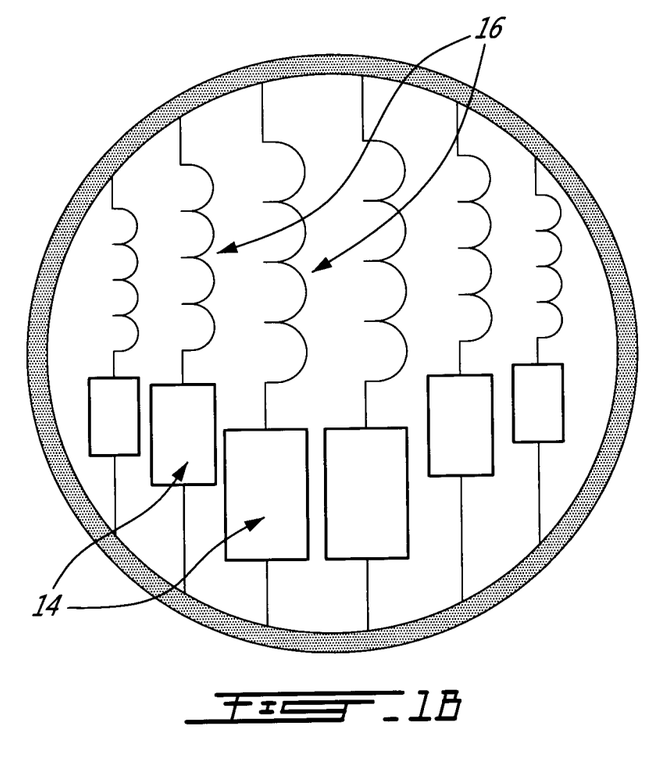
FIG. 1B is a schematic view of the conductors shown in FIG. 1A, wherein the conductors are represented by a series of different inductances and resistances.

In providing such a roof, a number of approaches can be taken. Referring to FIG. 1A, most practically this roof is constructed of long conductors 10. The long conductors 10 are strung across the top of the floating roof tank 12, closely spaced and parallel to each other. Note that the floating roof is not illustrated in FIG. 1A. However such a design results in a number of conductors of different lengths and so they would all have different resistances 14 and different inductances 16, as shown in FIG. 1B. This and other inherent factors would limit the effectiveness of this structure as an electromagnetic shield. Furthermore if one of the shorter conductors 10 at the side of the tank 12 is hit by lightning, the current would be divided in two paths but most of the current would still remain on that one location of the tank, which is not desirable.

Figure 2:
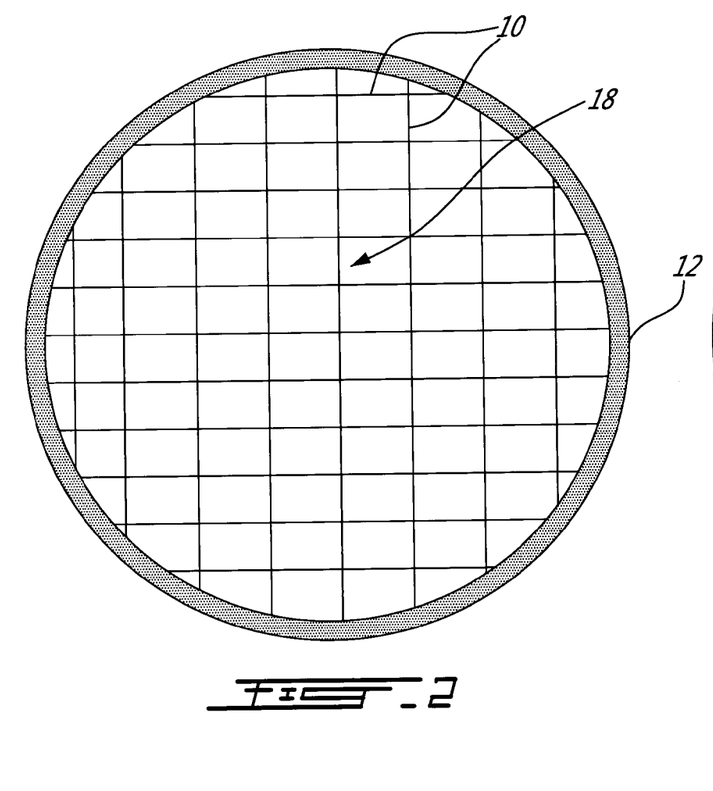
FIG. 2 is a top schematic view of a lightning protection apparatus, according to a second preferred embodiment of the present invention.

Another approach is to construct a complete closely spaced grid 18 on top of the open roof of a floating roof tank 12, as shown in FIG. 2. Note that the floating roof is not depicted in FIG. 2, but would appear as a disc below the grid 18. Such a grid 18 could be constructed of conductors 10 or expanded meshes. If the conductors 10 are spaced sufficiently closely, for example if the distance between two adjacent nodes of conductors 10 on the top rim of the tank 12 is spaced approximately 1% of the entire circumference of the tank 12, such an approach would provide improved electromagnetic shielding. However, with the grid approach there would be a large number of intersection points in between conductors 10 running in perpendicular directions or in between sheets of expanded mesh. All these intersections and contact points would need to be securely bonded to ensure effective shielding. The necessity of bonding so many intersection points and contact points makes this approach practically undesirable in many cases.

Figure 3:
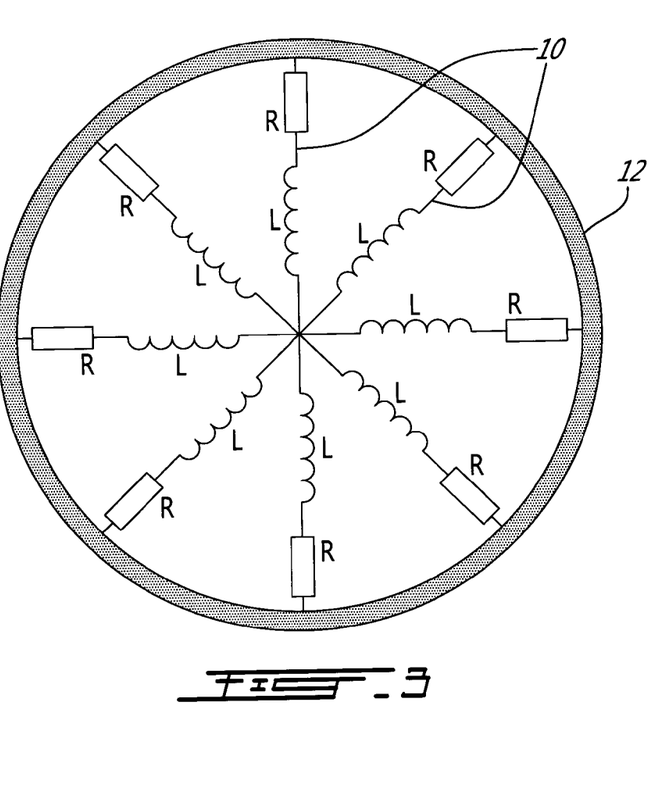
FIG. 3 is a top schematic view of a lightning protection apparatus, according to a third preferred embodiment of the present invention.

Yet another approach is be to attach a series of closely spaced conductors 10 from one end of the tank 12 to the other such that each of these conductors 10 passes over the center of the tank 12, as illustrated in FIG. 3. In such a design all the conductors 10 are of equal length, this length is the same as the diameter of the tank 12. So all the conductors would be of equal resistance R and inductance L. However, such an approach would leave a large intersection of conductors 10 at the center in which every conductor would be required to be securely bonded to all the other conductors, so this may be impracticable.

Figure 4:
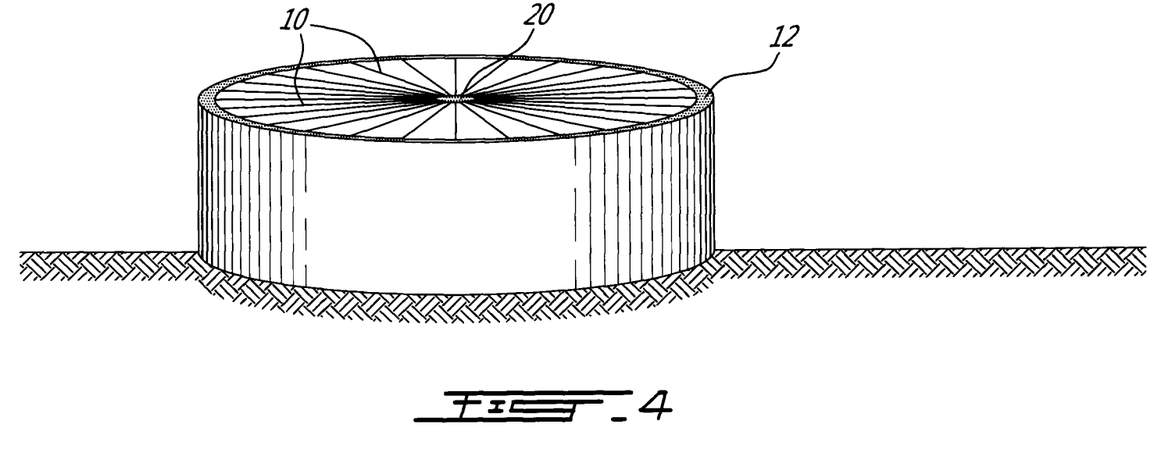
FIG. 4 is a perspective schematic view of a lightning protection apparatus, according to a fourth preferred embodiment of the present invention, installed on top of an external floating roof tank.

A solution to the above problem is a lightning protection apparatus installed on a floating roof tank as illustrated in FIG. 4. The apparatus includes an electrode 20, a circular ring in this example, which has a number of conductors 10 electrically bonded to its circumference so as to emanate radially. With the circular electrode 20 situated at the center of the tank 12, the opposite end terminals of the radially emanating conductors are electrically bonded to the top rim of the wall of the tank. The apparatus is thus suspended above the floating roof of the tank and is not in contact with the floating roof.

Figure 5:
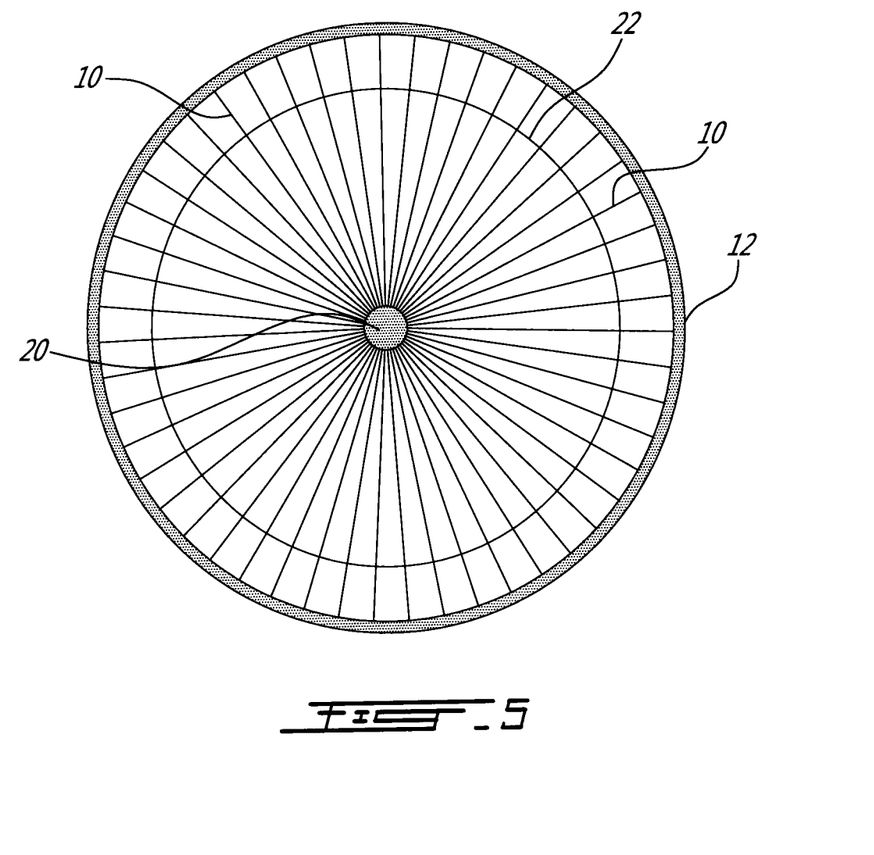
FIG. 5 is a top view of a lightning protection apparatus similar to the one shown in FIG. 4, with an additional conductor bonded to the apparatus in a transverse direction.
Figure 6:
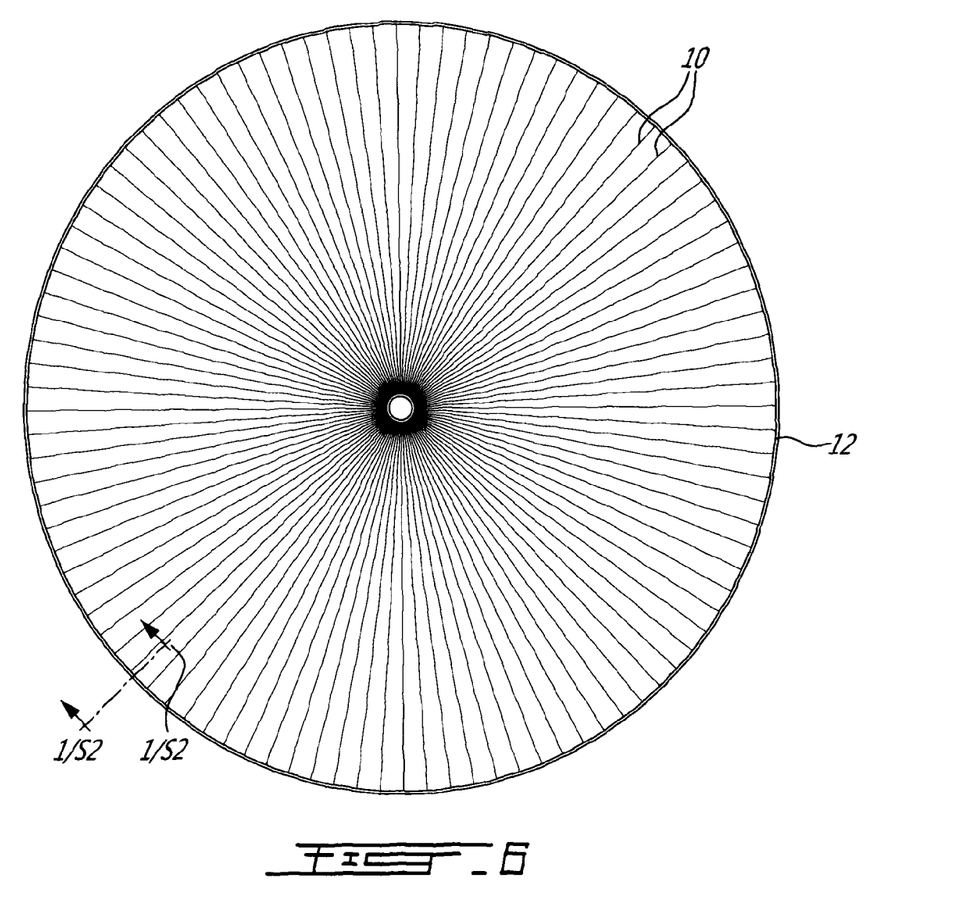
FIG. 6 is top view of a lightning protection apparatus similar to the one shown in FIG. 5.
Figure 7:
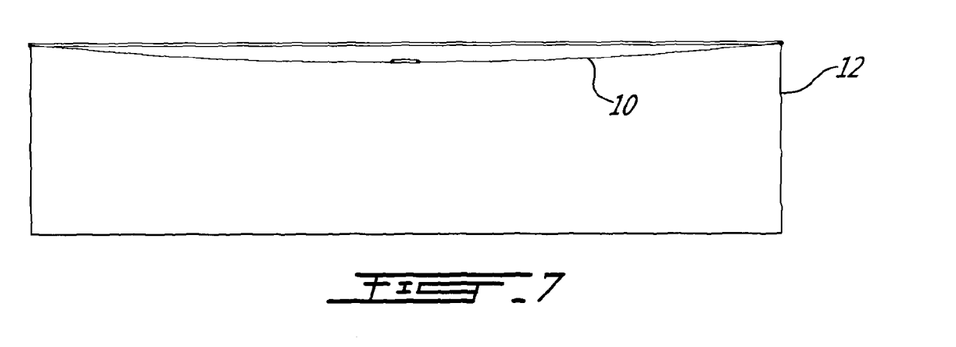
FIG. 7 is a side section view of the lightning protection apparatus of FIG. 6.
Figure 8:
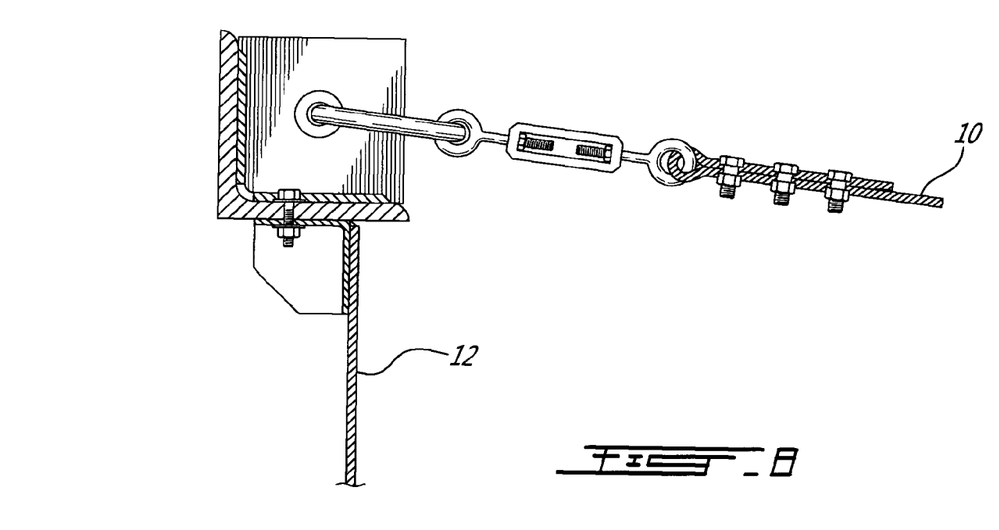
FIG. 8 is a side section view taken at line 1/S2 of FIG. 6.
Figure 9:
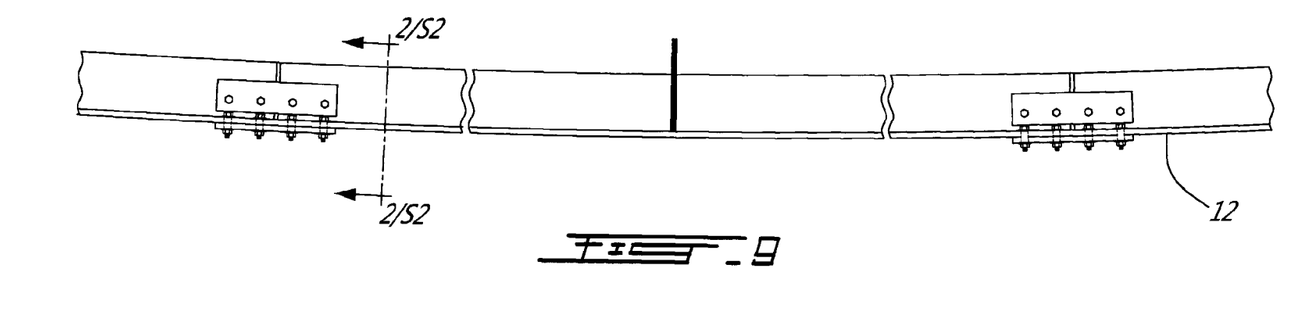
FIG. 9 is an enlarged view taken at circle 2/S2 of FIG. 6
Figure 10:
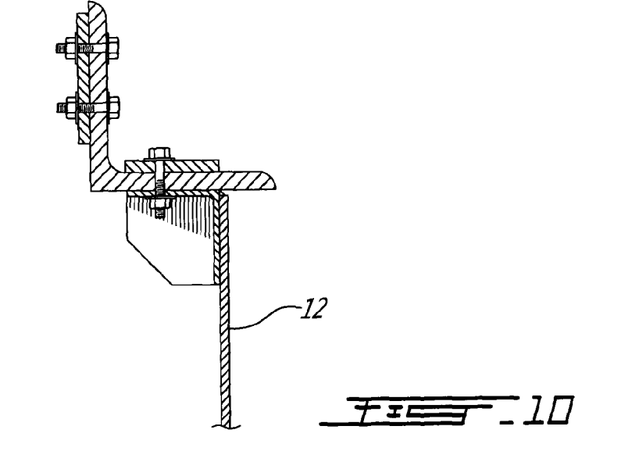
FIG. 10 is a side section view taken line 2/S2 of FIG. 9
Figure 11:
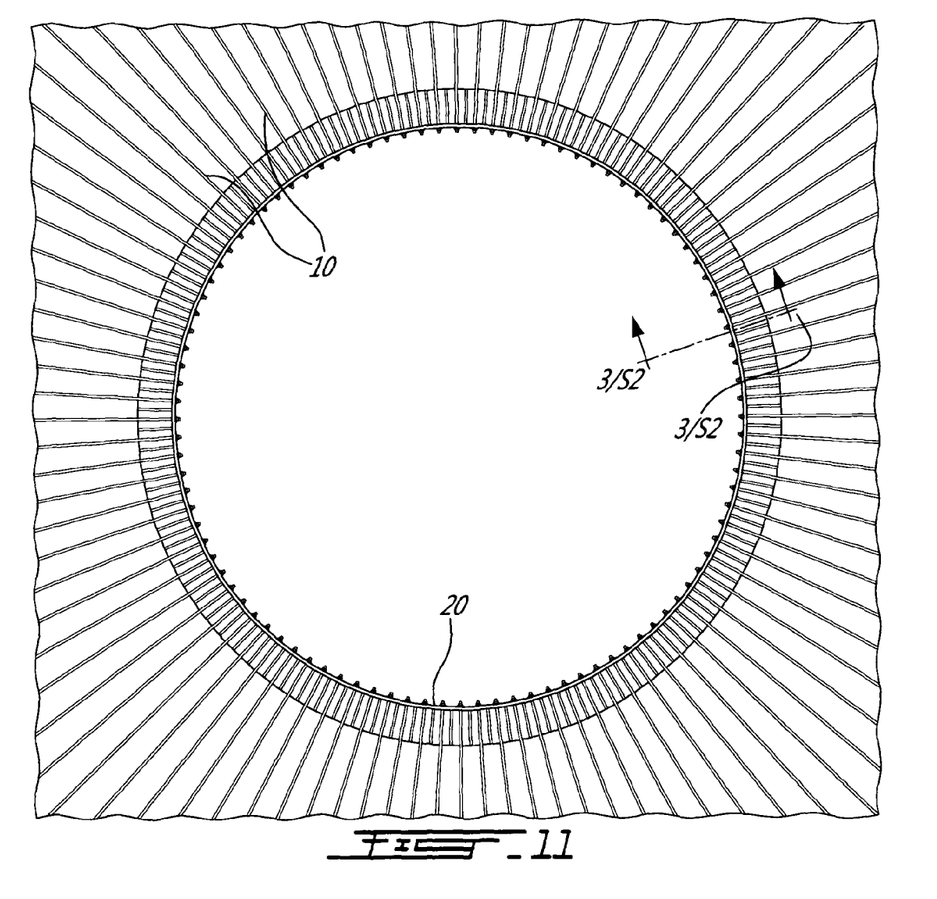
FIG. 11 is an enlarged view taken of the central electrode and conductors shown in FIG. 7.
Figure 12:
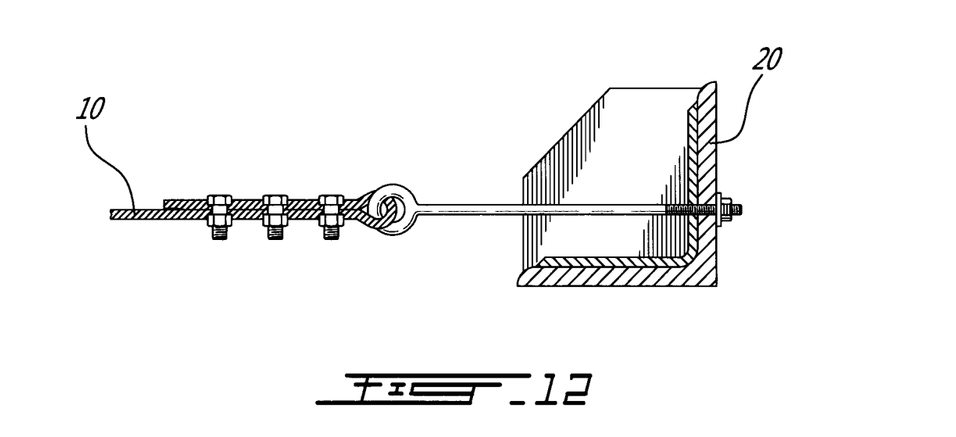
FIG. 12 is a side section view taken at line 3/S2 of FIG. 11.

The lightning protection apparatus preferably contains up to one hundred conductors 10 or more such that the spacing between any two adjacent conductors which are bonded to the tank wall rim is approximately 1% of the entire circumference of the tank 12. This close spacing is required to promote effective electromagnetic shielding. The radially emanating conductors 10 are sufficiently tensioned so as to avoid any excessive sagging and to avoid contact with the floating roof. Wherever desired, the means of electrically bonding the conductors 10 to the tank wall rim are made so as to be easily attached, tensioned and removed. For example, this could be achieved with the use of a system of ratchet reels, which are bolted to the wall of the floating roof tank. To further promote effective shielding a conductor 22, as illustrated in FIG. 5, may be bonded around the circumference of the apparatus to limit the spacing in the outer regions and to provide current paths in the transverse direction. However, such a conductor 22 would be required to be securely bonded at each intersection point. The relatively small number of intersection points with this design may make this approach more practical in some cases where the tanks is extremely large or where effective shielding is paramount.

Although the embodiment represented in the figure shows a central circular electrode, any other shape, such as a hexagon or a square could replace this. Furthermore the electrode may not necessarily be centred, this may however compromise the shielding effectiveness of the apparatus and for this purpose the apparatus should be as uniform and as symmetrical as possible.

An additional benefit of the apparatus of the present invention is that it will intercept any direct lightning strikes that would have otherwise fallen onto the floating roof of the tank. As such, the diameters of the conductors need to be sufficient to carry the lightning current. Since if any individual conductor is struck, the lightning current will be divided into two paths, the cross sectional area requirements should be less than that of a typical lightning down conductor which is meant to carry the entire lightning current. It should be noted however that although in such a case the current will at first be conducted via two paths, ultimately current flow to the tank rim will become uniform.

Although the present invention has been described hereinabove by way of specific embodiments thereof, it can be modified, without departing from the spirit and nature of the subject invention as defined in the appended claims.

The invention claimed is:

1. A lightning protection apparatus for a floating roof tank having an external floating roof, the lightning protection apparatus comprising:
   an electrode; and
   a plurality of conductors, each conductor having a first end electrically bonded to the electrode and a second opposite terminal end electrically bonded to an outer side wall of the floating roof tank;
   wherein the conductors emanate radially from the electrode and are spaced from each other so as to provide electromagnetic shielding to the floating roof tank from electromagnetic waves caused by a lighting strike, the apparatus being suspended above the external floating roof of the tank and not in contact with the external floating roof.

2. The lightning protection apparatus of claim 1, wherein the electrode is located at the centre of the floating roof tank and wherein the conductors uniformly emanate radially outwards from the electrode to the outer side wall of the floating roof tank.

3. The lightning protection apparatus of claim 2, wherein the opposite terminal ends of the radially emanating conductors are electrically bonded to a top rim of the outer side wall of the floating roof tank.

4. The apparatus according to claim 2, wherein an additional conductor is mounted in the transverse direction to the existing radially extending conductors and is bonded at each intersection point.

5. The apparatus according to claim 2, wherein the conductors are bonded to the tank wall by means for removal, attaching and tensioning the conductors with respect to the tank wall.

6. A method for protecting a floating roof tank having, an external floating roof from lightning strikes, the method comprising:
   providing an electrode and a plurality of conductors, each conductor having first end electrically bonded to the electrode and a second opposite terminal end;
   electrically bonding the second opposite terminals to a side wall of the floating roof tank;
   wherein the conductors are spaced from each other so as to provide electromagnetic shielding to the floating roof tank from electromagnetic waves caused by a lighting strike, the electrode and conductors being suspended above the external floating roof of the tank and not in contact with the external floating roof.

7. A lightning protection apparatus mountable onto a top rim of a floating roof tank having an external floating roof, the lightning protection apparatus comprising a number of closely spaced conductors that are electrically bonded to the top rim of an outer side wall of the floating roof tank and also electrically bonded to each other at intersection points so as to form a grid, the apparatus being suspended above the external floating roof of the tank and not in contact with the external floating roof.

8. The apparatus according to claim 3, wherein an additional conductor is mounted in the transverse direction to the existing radially extending conductors and is bonded at each intersection point.

9. The apparatus according to claim 3, wherein the conductors are bonded to the tank wall by means for removal, attaching and tensioning the conductors with respect to the tank wall.

10. The apparatus according to claim 4, wherein the conductors are bonded to the tank wall by means for removal, attaching and tensioning the conductors with respect to the tank wall.

11. The apparatus according to claim 8, wherein the conductors are bonded to the tank wall by means for removal, attaching and tensioning the conductors with respect to the tank wall.

* * * * *